(12) United States Patent
Nakai et al.

(10) Patent No.: US 9,634,471 B2
(45) Date of Patent: Apr. 25, 2017

(54) GROMMET AND SEALING STRUCTURE USING GROMMET

(71) Applicant: SUMITOMO WIRING SYSTEMS, LTD., Mie (JP)

(72) Inventors: Hirokazu Nakai, Mie (JP); Shunya Sano, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/966,580

(22) Filed: Dec. 11, 2015

(65) Prior Publication Data

US 2016/0180989 A1 Jun. 23, 2016

(30) Foreign Application Priority Data

Dec. 19, 2014 (JP) ................................. 2014-257059

(51) Int. Cl.
| | | |
|---|---|---|
| H01B 17/58 | (2006.01) | |
| H02G 3/04 | (2006.01) | |
| B60R 16/02 | (2006.01) | |

(52) U.S. Cl.
CPC ....... *H02G 3/0468* (2013.01); *B60R 16/0222* (2013.01); *H02G 3/0418* (2013.01); *H02G 3/0443* (2013.01)

(58) Field of Classification Search
CPC ............................ H02G 3/0468; H02G 3/0406
USPC ...................................................... 174/72 A
See application file for complete search history.

(56) References Cited

U.S. PATENT DOCUMENTS

| | | | | |
|---|---|---|---|---|
| 6,376,777 B1 * | 4/2002 | Ito | ........................ | H02G 3/0468 16/2.1 |
| 2004/0144557 A1 * | 7/2004 | Miyazaki | ........... | H01R 13/6592 174/72 A |
| 2013/0299234 A1 * | 11/2013 | Izawa | .................. | H02G 3/0406 174/70 R |
| 2014/0190744 A1 * | 7/2014 | Fuzioka | ................... | H02G 3/32 174/77 R |
| 2015/0060134 A1 * | 3/2015 | Minami | .............. | B60R 16/0222 174/72 A |

FOREIGN PATENT DOCUMENTS

JP 2006-310067 11/2006

* cited by examiner

*Primary Examiner* — Hoa C Nguyen
*Assistant Examiner* — Amol Patel
(74) *Attorney, Agent, or Firm* — Greenblum & Bernstein, P.L.C.

(57) ABSTRACT

Provided are a grommet capable of preventing a corrugated tube from being crushed due to attaching of a fixing member, and a sealing structure using a grommet. A grommet has a main portion having a tubular shape capable of being externally fitted to an end portion of an exterior member of a wire harness, the exterior member having a relatively high rigidity. An inner circumferential face of the main portion is a first sealing face capable of establishing intimate contact with an outer circumferential face of the exterior member. An outer circumferential face of the main portion is a second sealing face capable of establishing intimate contact with an inner circumferential face of an end portion of a corrugated tube, the end portion being put over the outside of the main portion.

11 Claims, 3 Drawing Sheets

GROMMET AND SEALING STRUCTURE USING GROMMET

TECHNICAL FIELD

The present invention relates to grommets and sealing structures using grommets.

BACKGROUND ART

Ordinarily, wire harnesses routed in a vehicle or the like are protected by being inserted in a metal or resin pipe or an exterior member such as a corrugated tube. It is known to seal a corrugated tube and an exterior member having a relatively high rigidity, such as a pipe, with a grommet for stopping water (e.g., as described in JP 2006-310067A mentioned below). A grommet is fixed, at one end, to an exterior member having a relatively high rigidity, and is fixed, at the other end, to an end portion of a corrugated tube. Sealing is achieved by both end portions of the grommet establishing intimate contact with the exterior member and the end portion of the corrugated tube.

JP 2006-310067A is an example of related art.

Incidentally, in order to fix the end portion of the grommet and the end portion of the corrugated tube to each other, the end portion of the grommet is put over the end portion of the corrugated tube, and these end portions are often fastened with a cable tie, for example. However, if these end portions are strongly fastened with the cable tie, there is a possibility that the corrugated tube is crushed, resulting in a decrease in sealing capability.

The present invention has been completed based on the foregoing situation, and an object thereof is to provide a grommet capable of preventing a corrugated tube from being crushed due to attaching of a fixing member, and a sealing structure using a grommet.

SUMMARY OF THE INVENTION

A grommet according to the present invention may include: a main portion having a tubular shape capable of being externally fitted to an end portion of an exterior member of a wire harness, the exterior member having a relatively high rigidity, wherein an inner circumferential face of the main portion is a first sealing face capable of establishing intimate contact with an outer circumferential face of the exterior member, and an outer circumferential face of the main portion is a second sealing face capable of establishing intimate contact with an inner circumferential face, of an end portion of a corrugated tube, put over the outside of the main portion.

A sealing structure using a grommet according to the present invention seals a corrugated tube and an exterior member of a wire harness, the exterior member having a relatively high rigidity, using the above-described grommet, wherein the main portion is externally fitted to an end portion of the exterior member, and an end portion of the corrugated tube is put over the outside of the main portion, a fixing member is attached to a portion, of the corrugated tube, put over the main portion, and the first sealing face is in intimate contact with the outer circumferential face of the exterior member, and the second sealing face is in intimate contact with an inner circumferential face of the corrugated tube.

According to the present invention, the end portion of the corrugated tube in a state of being put over the exterior member having a relatively high rigidity is fixed using the fixing member, and it is thereby possible to prevent the corrugated tube from being crushed due to attaching of the fixing member. In addition, only attaching the fixing member at a single portion makes it possible to fix the exterior member, the grommet, and the corrugated tube.

EMBODIMENTS OF THE INVENTION

A preferable mode of the present invention will be hereinafter described. In the grommet according to the present invention, the second sealing face may have a protruding portion capable of being fitted to recesses and projections of the corrugated tube. With this configuration, since the end portion of the corrugated tube is locked at the second sealing face, an operation of attaching a fixing member can be easily performed.

The grommet according to the present invention may further include an extending portion extending from the main portion along the outer circumferential face of the exterior member. With this configuration, the grommet can be easily fixed to the exterior member by winding a tape around the extending portion or fastening the extending portion with a cable tie.

In the grommet according to the present invention, a pair of the extending portions may be provided at both ends of the main portion in a width direction. With this configuration, the pair of extending portions can be held and pulled when attaching the grommet to the end portion of the exterior member, and accordingly, the operation of attaching the grommet to the exterior member can be easily performed.

In the grommet according to the present invention, when the end portion of the exterior member enters the inside of the main portion by a predetermined dimension, an end of the exterior member may be able to be seen from an end of the main portion. With this configuration, it can be seen from the outside that the exterior member has been sufficiently fitted into the main portion, and accordingly, an operation of attaching the grommet to the exterior member can be easily performed.

Embodiment

Figure 1:
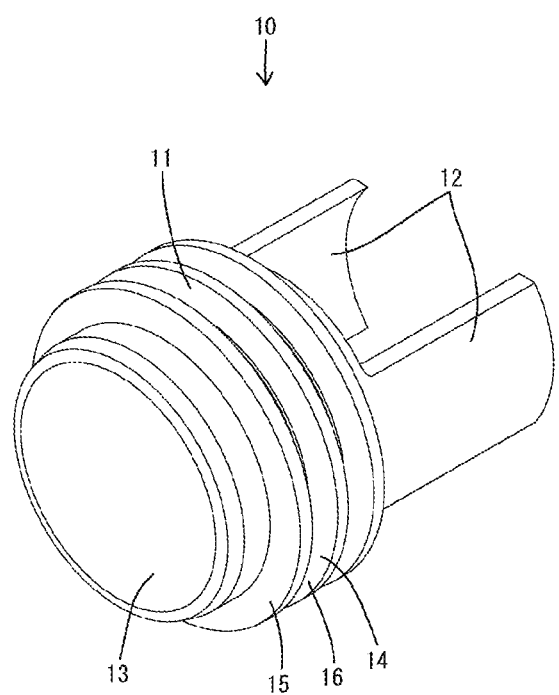
FIG. 1 is a perspective view of a grommet according to the present embodiment.

Hereinafter, one embodiment of the present invention will be described in detail with reference to FIGS. 1 to 3.

A grommet 10 according to the present embodiment is for sealing a corrugated tube 20 and a metal or resin pipe (exterior member) P for protecting a wire harness (not shown) routed below a floor of a vehicle. The pipe P has a cylindrical shape into which wires of a wire harness W can be inserted, and is bent three-dimensionally along a routing path of the wire harness W. The corrugated tube 20 is a molded resin piece having crest portions 21 and trough portions 22 that are continuous in a circumferential direction and alternately provided in an axial direction. In the following description, regarding each constituent member, the left front side, the right distal side, the upper side, and the lower side in FIG. 1 are assumed to be front, rear, above, and below, respectively.

The grommet 10 is integrally formed by an elastic rubber material, and has a main portion 11 having a tubular shape capable of being externally fitted to an end portion of the pipe P, and a pair of extending portions 12 that extend rearward from a rear end of the main portion 11.

The main portion 11 has a cylindrical shape whose internal space has a size that matches the outer shape of the pipe P, and an inner circumferential face of the main portion 11 is a first sealing face 13 capable of establishing intimate contact with an outer circumferential face of the pipe P. The first sealing face 13 is a smooth face without recesses or projections, and the entire circumference thereof is to establish intimate contact with the outer circumferential face of the pipe P.

Meanwhile, an outer circumferential face of the main portion 11 is a second sealing face 14 capable of establishing intimate contact with an inner circumferential face of an end portion of the corrugated tube 20 which is put over the outside of the main portion 11. The second sealing face 14 has a plurality of protruding portions 15 and groove portions 16 that can be fitted to the shape of the corrugated tube 20 with recesses and projections (crest portions 21 and trough portions 22) and are formed alternately and continuously in the axial direction. Each of the protruding portions 15 and the groove portions 16 has a shape that matches the outer shape (corresponding crest portion 21 or trough portion 22) of the corrugated tube 20 and is continuous in the circumferential direction. Note that three protruding portions 15 and two groove portions 16 are provided according to the present embodiment.

Figure 2:
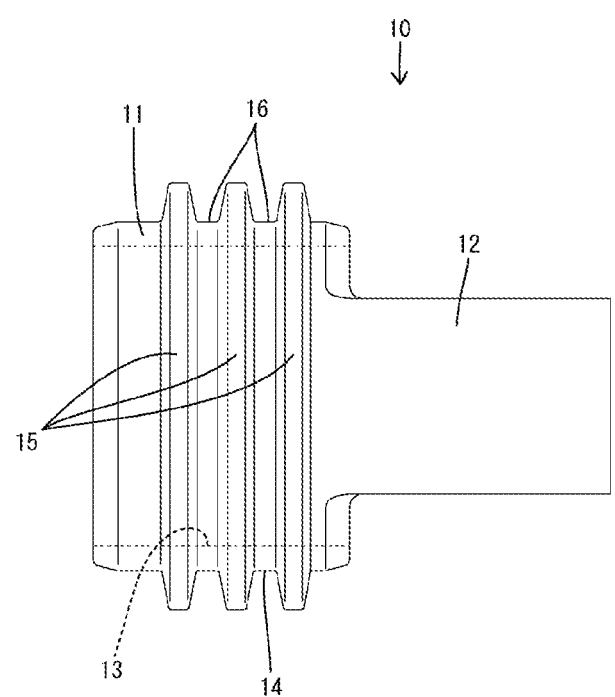
FIG. 2 is a side view of a grommet.
Figure 3:
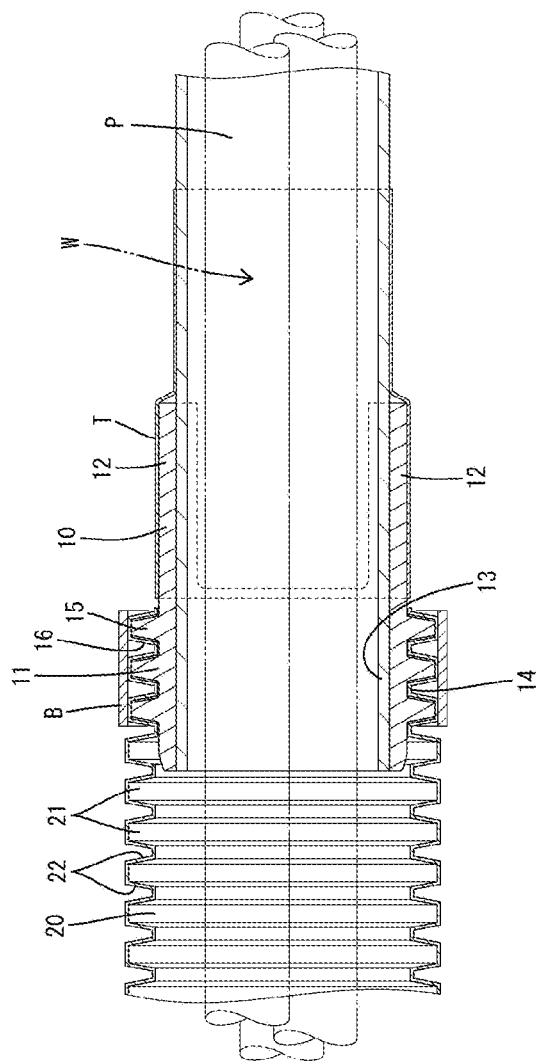
FIG. 3 is a cross-sectional view showing a state where a pipe and a corrugated tube are sealed by a grommet.

As shown in FIG. 2, a front face and a rear face of each protruding portion 15 incline such that when following in the inward radius direction they gradually separate respectively in the frontward and rearward directions from a front edge and a rear edge of a protruding end face of the protruding portion 15. Note that the front face and the rear face of each protruding portion 15 have an equal gradient.

The protruding portion 15 located on the foremost side of the plurality of protruding portions 15 is arranged at a position separated rearward from a front end of the main portion 11, and the protruding portion 15 located on the rearmost side is arranged at a position separated forward from a rear end of the main portion 11. Note that the main portion 11 protrudes more to the front of the foremost protruding portion 15 than to the rear of the rearmost protruding portion 15.

The pair of extending portions 12 are provided at both end portions of the main portion 11 in the width direction. Each extending portion 12 has a form extending rearward without a step from a part of the main portion 11 in the circumferential direction, and is arranged along a part of the outer circumferential face of the pipe P in the circumferential direction. Each extending portion 12 forms an arc shape having a radius that is equal to the radius of the main portion 11. The pair of extending portions 12 have symmetrical shapes with respect to the axis of the main portion 11. An opening is formed in the vertical direction between the pair of extending portions 12, and the width dimension (dimension in the circumferential direction) of the extending portions 12 is larger than the width of this opening.

Next, an example of an operation of sealing the pipe P and the corrugated tube 20 using the grommet 10 will be described.

First, the grommet 10 is attached to an end portion of the pipe P. The front of the pipe P is oriented frontward, and the grommet 10 is attached thereto by pulling the grommet 10 rearward from the front side of the pipe P. At this time, the pair of extending portions 12, which are oriented to the rear side of the grommet 10, are held with both hands and put over the end portion of the pipe P by spreading the pair of extending portions 12, and the main portion 11 is put over the end portion of the pipe P by alternately pulling the individual extending portions 12. Here, the grommet 10 is pulled up to a position at which a front end of the pipe P is aligned with a front end of the grommet 10, it is then visually checked that the front end of the pipe P is aligned with the front end of the grommet 10, and thereafter, a tape T is wound around the extending portions 12. The tape T is wound around a portion of the outer circumferential face of the pipe P that is exposed to the outside from the opening between the pair of extending portions 12 as well as outer circumferential faces of the extending portions 12, and is also wound, from the extending portions 12, around a portion of the outer circumferential face of the pipe P that is located rearward of the extending portions 12. The grommet 10 is thereby fixed to the end portion of the pipe P in a state where the entire main portion 11 is in intimate contact with the end portion of the pipe P. Note that the grommet 10 may be fixed to the end portion of the pipe P by fastening the periphery of the extending portions 12 with a cable tie, rather than winding the tape therearound.

Next, an end portion of the corrugated tube 20 is put over the outside of the grommet 10. Upon putting the end portion of the corrugated tube 20 over the outside of the main portion 11 of the grommet 10, the protruding portions 15 of the main portion 11 are fitted to the inside of the crest portions 21 of the corrugated tube 20, and the groove portions 16 of the main portion 11 are fitted to the inside of the trough portions 22 of the corrugated tube 20. The corrugated tube 20 is thereby positioned in the axial direction relative to the grommet 10.

Next, the end portion of the corrugated tube 20 is fastened with a cable tie B and fixed. The end portion of the corrugated tube 20 (a portion thereof that is put over the main portion 11) is fastened with the cable tie B. Thereby, the end portion of the corrugated tube 20 is in intimate contact with the second sealing face 14 of the grommet 10. Specifically, the protruding end faces of the protruding portions 15 of the main portion 11 are in intimate contact with the inside of protruding end faces of the crest portions 21 of the corrugated tube 20, front and rear faces of each protruding portion 15 of the main portion 11 are in intimate contact with the inside of front and rear faces of the corresponding crest portion 21 of the corrugated tube 20, and bottom faces of the groove portions 16 of the main portion 11 are in intimate contact with the inside of bottom faces of the trough portions 22 of the corrugated tube 20. Thus, the pipe P and the corrugated tube 20 are connected in a state of being in communication with each other in the axial direction, and are kept in a state where the first sealing face 13 of the main portion 11 is in intimate contact with the outer circumferential face of the pipe P, and the second sealing face 14 of the main portion 11 is in intimate contact with the inner circumferential face of the corrugated tube 20.

The operation of sealing the pipe P and the corrugated tube 20 using the grommet 10 is thus completed.

Next, operations and effects of the embodiment having the above configuration will be described.

The grommet 10 in this embodiment has the main portion 11 having a tubular shape capable of being externally fitted to an end portion of the pipe P, the inner circumferential face of the main portion 11 is the first sealing face 13 capable of establishing intimate contact with the outer circumferential face of the pipe P, and the outer circumferential face of the main portion 11 is the second sealing face 14 capable of establishing intimate contact with the inner circumferential face of the end portion of the corrugated tube 20 that is put over the outside of the main portion 11. With this configuration, by fixing, with the cable tie B, the end portion of the corrugated tube 20 in a state of being put over the pipe P, which has a relatively high rigidity, the corrugated tube 20 can be prevented from being crushed due to the fastening with the cable tie B.

The second sealing face 14 has the protruding portions 15 that can be fitted to the shape of the corrugated tube 20 with recesses and projections. With this configuration, the end portion of the corrugated tube 20 is locked at the second sealing face 14, and accordingly, the fastening operation using the cable tie B can be easily performed.

The grommet 10 has the extending portions 12 extending from the main portion 11 along the outer circumferential face of the pipe P. With this configuration, the grommet 10 can be easily fixed to the pipe P by winding the tape T around the extending portions 12.

The pair of extending portions 12 are provided at the respective ends of the main portion 11 in the width direction. With this configuration, the pair of extending portions 12 can be held and pulled when attaching the grommet 10 to the end portion of the pipe P, and accordingly, the operation of attaching the grommet 10 to the pipe P can be easily performed.

When the end portion of the pipe P enters the inside of the main portion 11 by a predetermined dimension, the end of the pipe P can be seen from the end of the main portion 11. With this configuration, it can be seen from the outside that the pipe P has been sufficiently fitted into the main portion 11, and accordingly, the operation of attaching the grommet 10 to the pipe P can be easily performed.

Other Embodiments

The present invention is not limited to the embodiment as described in the above description and the drawings, and for example, the following embodiments are also encompassed in the technical scope of the present invention.

(1) Although the above embodiment relates to the case where the exterior member of the wire harness W is the pipe P, the present invention is not limited thereto. The exterior member may be a shielding shell or the like that covers a connector connected to an end portion of the wire harness, for example. In this case, the main portion of the grommet may be externally fitted to a tubular portion provided in the shielding shell.

(2) In the above embodiment, the tape T is wound around the extending portions 12 of the grommet 10 to fix the grommet 10 to the end portion of the pipe P before attaching the corrugated tube 20. However, the present invention is not limited thereto, and the grommet may be fixed to the end portion of the pipe after fixing the end portion of the corrugated tube to the grommet.

(3) In the above embodiment, the plurality of protruding portions 15 and groove portions 16 that can be fitted to the shape of the corrugated tube 20 having recesses and projections are formed on the second sealing face 14 of the grommet 10. However, the present invention is not limited thereto, and the second sealing face of the grommet may have any shape as long as the second sealing face can be in intimate contact with the inner circumferential face of the corrugated tube. For example, the second sealing face may be a flat face that does not have the above-described protruding portions and groove portions. Alternatively, for example, the second sealing face may have a lip portion that is intimate contact with the corrugated tube, for example.

(4) In the above embodiment, the plurality of protruding portions 15 and groove portions 16 that can be fitted to the shape of the corrugated tube 20 having recesses and projections are formed on the second sealing face 14 of the grommet 10. However, the present invention is not limited thereto. For example, only a single protruding portion may be provided on the second sealing face of the grommet and locked with the corrugated tube.

(5) In the above embodiment, the first sealing face 13 is a flat surface. However, the present invention is not limited thereto, and the first sealing face may have any shape as long as the first sealing face can be in intimate contact with the outer circumferential face of the pipe. For example, the first sealing face may be provided with a lip portion that is in intimate contact with the outer circumferential face of the pipe.

(6) In the above embodiment, the grommet 10 has the extending portions 12, but the grommet does not necessarily have to have the extending portions.

(7) In the above embodiment, the grommet 10 is provided with a pair of extending portions 12. However, the present invention is not limited thereto, and the number of extending portions may be changed as appropriate. Only one extending portion may be provided, or three or more extending portions may be provided.

(8) In the above embodiment, the grommet 10 is provided with the pair of extending portions 12. However, the present invention is not limited thereto, and for example, the grommet may have a form that is closed over the entire circumference.

(9) Although the above embodiment has described the case where the fixing member is the cable tie B, the present invention is not limited thereto, and the fixing member may be a swaging ring, a tape, or the like, for example.

What is claimed is:

1. A grommet comprising:
   a main portion having a tubular shape configured to be externally fitted to an end portion of an exterior member of a wire harness, the exterior member having a relatively high rigidity,
   wherein an inner circumferential face of the main portion is a first sealing face configured to establish intimate contact with an outer circumferential face of the exterior member, and
   an outer circumferential face of the main portion is a second sealing face configured to establish intimate contact with an inner circumferential face of an end portion of a corrugated tube positioned over the outside of the main portion, and
   the second sealing face is configured to be fitted to recesses and projections of the corrugated tube.

2. The grommet according to claim 1,
   wherein the exterior member has a higher rigidity than the corrugated tube.

3. The grommet according to claim 1,
   wherein the second sealing face configured to be fitted to recesses and projections of the corrugated tube includes a protruding portion.

4. The grommet according to claim 1, further comprising:
   an extending portion extending from the main portion along the outer circumferential face of the exterior member.

5. The grommet according to claim 4,
   wherein a pair of the extending portions are provided at laterally opposed positions in a width direction.

6. The grommet according to claim 1,
wherein when the end portion of the exterior member enters the inside of the main portion by a predetermined dimension, an end of the exterior member can be seen from an end of the main portion.

7. A sealing structure comprising:
a corrugated tube;
an exterior member of a wire harness, the exterior member having a relatively high rigidity;
a fixing member; and
the grommet according to claim 1, the grommet sealing the corrugated tube and the exterior member,
wherein the main portion of the grommet is externally fitted to an end portion of the exterior member, and an end portion of the corrugated tube is positioned over the outside of the main portion,
the fixing member is attached to a portion of the corrugated tube positioned over the main portion, and
the first sealing face is in intimate contact with the outer circumferential face of the exterior member, and the second sealing face is in intimate contact with an inner circumferential face of the corrugated tube.

8. The grommet according to claim 1,
the second sealing face configured to be fitted to recesses and projections of the corrugated tube including a plurality of protruding portions and groove portions positioned alternately in the axial direction of the grommet and configured to be fitted to recesses and projections of the corrugated tube.

9. A grommet comprising:
a main portion having a tubular shape configured to be externally fitted to an end portion of an exterior member of a wire harness, the exterior member having a relatively high rigidity, and
an extending portion extending from the main portion along the outer circumferential face of the exterior member,
wherein an inner circumferential face of the main portion is a first sealing face configured to establish intimate contact with an outer circumferential face of the exterior member, and
an outer circumferential face of the main portion is a second sealing face configured to establish intimate contact with an inner circumferential face of an end portion of a corrugated tube positioned over the outside of the main portion.

10. The grommet according to claim 9,
wherein a pair of the extending portions are provided at laterally opposed positions in a width direction.

11. A sealing structure comprising:
a corrugated tube;
an exterior member of a wire harness, the exterior member having a relatively high rigidity;
a fixing member; and
a grommet including a main portion having a tubular shape configured to be externally fitted to an end portion of an exterior member of a wire harness, the exterior member having a relatively high rigidity,
wherein an inner circumferential face of the main portion is a first sealing face configured to establish intimate contact with an outer circumferential face of the exterior member, and
an outer circumferential face of the main portion is a second sealing face configured to establish intimate contact with an inner circumferential face of an end portion of a corrugated tube positioned over the outside of the main portion,
the grommet sealing the corrugated tube and the exterior member,
wherein the main portion of the grommet is externally fitted to an end portion of the exterior member, and an end portion of the corrugated tube is positioned over the outside of the main portion,
the fixing member is attached to a portion of the corrugated tube positioned over the main portion, and
the first sealing face is in intimate contact with the outer circumferential face of the exterior member, and the second sealing face is in intimate contact with an inner circumferential face of the corrugated tube.

* * * * *